United States Patent

Chang

[11] Patent Number: 5,566,463
[45] Date of Patent: Oct. 22, 1996

[54] SERVO SYSTEM

[75] Inventor: Fu L. Chang, Chia-yi, Taiwan

[73] Assignee: Waysia Industrial Co., Ltd., Chia-yi, Taiwan

[21] Appl. No.: 259,794

[22] Filed: Jun. 15, 1994

[51] Int. Cl.$^6$ ........................................... G01B 5/02
[52] U.S. Cl. ................................. 33/710; 33/655
[58] Field of Search ........................... 33/710, 655, 700, 33/712, 715, 716, 792, 793

[56] References Cited

U.S. PATENT DOCUMENTS

| | | |
|---|---|---|
| 2,276,302 | 3/1942 | Guttmann . |
| 3,780,440 | 12/1973 | Taylor ....................... 33/756 |
| 3,791,037 | 2/1974 | DiCiaccio et al. ........... 33/655 |
| 3,841,140 | 10/1974 | Hryc . |
| 4,969,274 | 11/1990 | Chang ....................... 33/710 |

*Primary Examiner*—Alvin Wirthlin
*Attorney, Agent, or Firm*—Brinks Hofer Gilson & Lione

[57] ABSTRACT

A servo system includes a driven body (C), a hydraulic driving unit (A) for moving the driven body (C), a mechanical hydraulic servo valve (1), a sheave (31), a flexible measuring tape (33), a rotary driving source (M) and an adjusting unit (4,5,6,7). The servo valve (1) includes a spring-biased movable spool (11) and can activate the driving unit (A) to move the driven body (C) when the spool (11) is moved. The sheave (31) is mounted on the driven body (C) and has an outer peripheral surface. The measuring tape (33) has a first end portion secured to the sheave (31), a second end portion (331), and an intermediate portion wound on the sheave (31) along the outer peripheral surface of the sheave (31). The rotary driving source (M) is coupled operably to the sheave (31) and is operable to rotate the sheave (31) in order to wind and unwind the measuring tape (33). The adjusting unit (4,5,6,7) is coupled to the second end portion (331) of the measuring tape (33) and the spool (11) so as to move the spool (11) by a distance equivalent to linear displacement of the measuring tape (33) multiplied by a selected factor less than 1 so as to improve performance of the system.

16 Claims, 6 Drawing Sheets

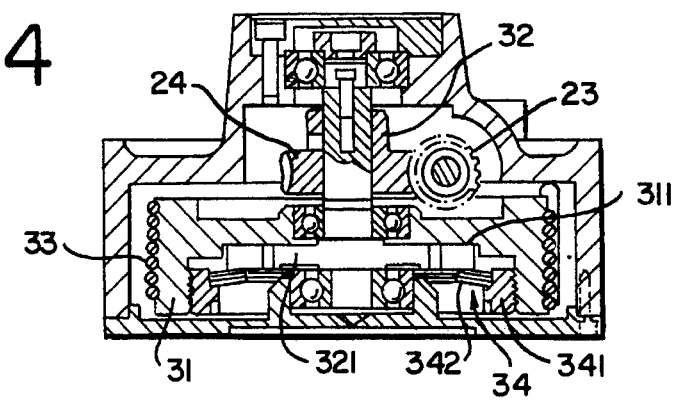
FIG. 4
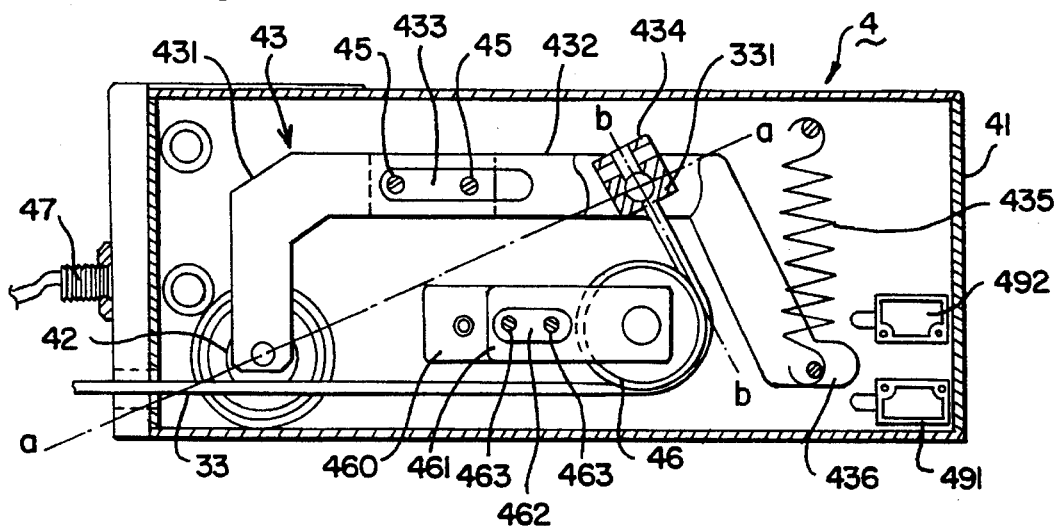
FIG. 5
FIG. 7
FIG. 6
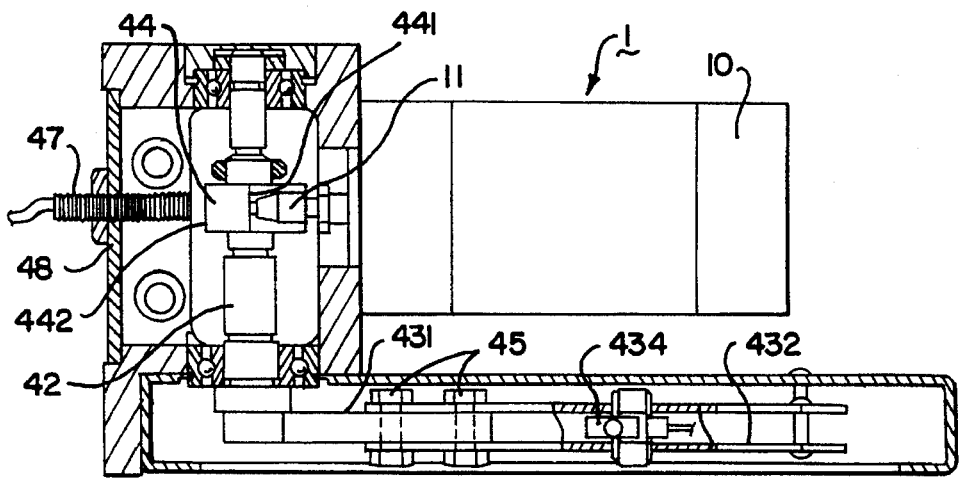

1

SERVO SYSTEM

This invention relates to a servo system, more particularly to a hydraulic servo system which has a controlling means to enable the spool of a servo valve to move by a distance equivalent to linear displacement of a measuring tape multiplied by a selected factor.

A conventional servo system is disclosed in U.S. Pat. No. 4,969,274 by the applicant of the present invention. The patented conventional servo system can effect a remote digitized positioning control of high precision hydraulically with the use of a flexible measuring tape. The measuring tape is connected to a spool of a servo valve and is wound on a sheave. When a driven body of the conventional servo system encounters a servo error, the servo error is fed back to the spool of the servo valve by the measuring tape so as to cause the servo valve to generate a control function in order to result in corresponding compensative movement of the driven body. However, under such arrangement of a conventional servo system, both the main control signal, that is the linear movement acting on the spool due to the original command, and the feedback signal use the same transfer unit, that is constituted by the sheave and the measuring tape, and are transferred to the spool continuously at the same time to perform the control function. Supposing the variation of mechanical condition in the system is too large, or the motions of the hydraulic driving unit and the driven unit are not smooth, such as the difference between dynamic and static friction coefficients is too large, poor geometric precision, movement impedance is too tight or too loose, the components of the system experience uneven resistance caused by wearing after prolonged use, or the force conditions differ from the initial design, etc., the intensity of the feedback signal will be too strong, even larger than the main control signal, so that when the feedback and main control signals are added together and are transferred to the servo valve, an over control phenomenon will occur. At worst, the driven body may be caused to vibrate, or over shoot and experience resonance. On the other hand, the impedance of the driven body sometimes tends to be reduced as a result of wearing, so that the required force for driving becomes smaller. At this time, the intensity of the control signal should be adjusted in an opposite way similar to the above manner so as to achieve better control performance. Therefore, if the aforementioned conventional servo system can incorporate therewith an adjusting means that can optionally adjust the control signal intensity depending upon the variation of the conditions of the system, the conventional servo system will be applied more easily and widely.

Therefore, the main object of the present invention is to provide a servo system in which the control signal intensity can be varied depending on the characteristics of the system.

Another object of the present invention is to provide a dual closed-loop servo system which achieves feedback compensative control by the use of mechanical and electrical means so as to increase the precision of the system.

According to the present invention, a servo system includes a driven body, a hydraulic driving unit for moving the driven body, a mechanical hydraulic servo valve, a sheave, a flexible measuring tape, a rotary driving source and an adjusting means. The servo valve includes a spring-biased movable spool and can activate the driving unit to move the driven body when the spool is moved. The sheave is mounted on the driven body and has an outer peripheral surface. The measuring tape has a first end portion secured to the sheave, a second end portion, and an intermediate portion wound on the sheave along the outer peripheral surface of the sheave. The rotary driving source is coupled operably to the sheave and is operable to rotate the sheave in order to wind and unwind the measuring tape. The adjusting means is coupled to the second end portion of the measuring tape and the spool so as to move the spool by a distance equivalent to linear displacement of the measuring tape multiplied by a selected factor less than 1 in order to improve performance of the system.

Other features and advantages of the present invention will become apparent in the following detailed description of the preferred embodiments, with reference to the accompanying drawings, of which:

FIG. 4 is a sectional view taken along the line IV—IV in FIG. 3;

FIG. 5 is a schematic view showing an adjusting means of the servo system according to a first embodiment of the present invention;

FIG. 6 is another schematic view illustrating the adjusting means shown in FIG. 5;

FIG. 7 is a partly enlarged view illustrating the adjusting means shown in FIG. 5;

Before the present invention is described in greater detail, it should be noted that like elements are indicated by the same reference numerals throughout the disclosure.

Figure 1:
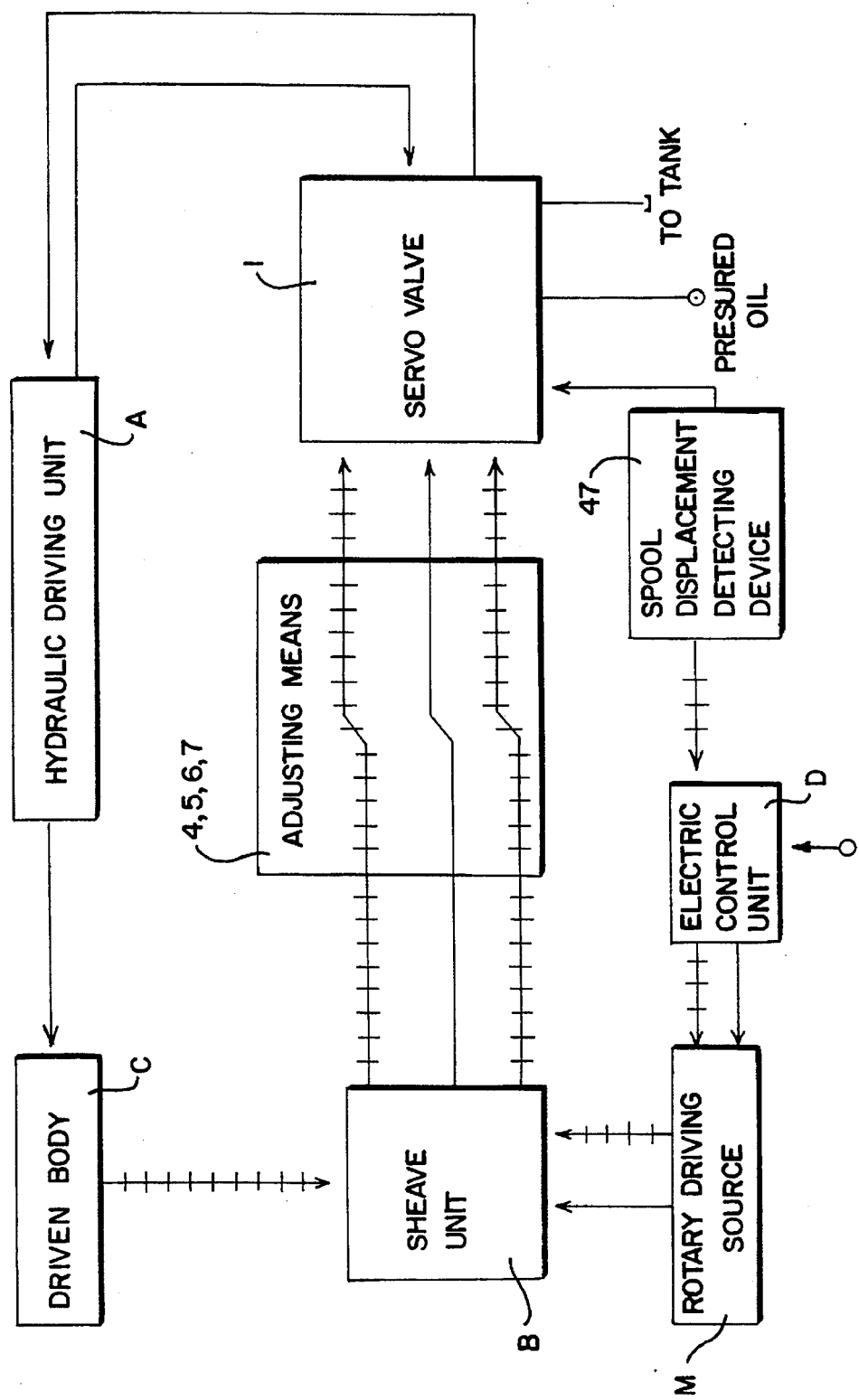
FIG. 1 is a schematic block diagram illustrating a servo system according to the present invention.

As shown in FIG. 1, a servo system according to the present invention includes a hydraulic driving unit (A), a sheave unit (B), a driven body (C), an electric control unit (D), a rotary driving source (M), a servo valve (1), an adjusting means (4,5,6,7) and a displacement detecting device (47).

The rotary driving source (M) may be a motor having a decelerating mechanism (not shown).

Figure 3:
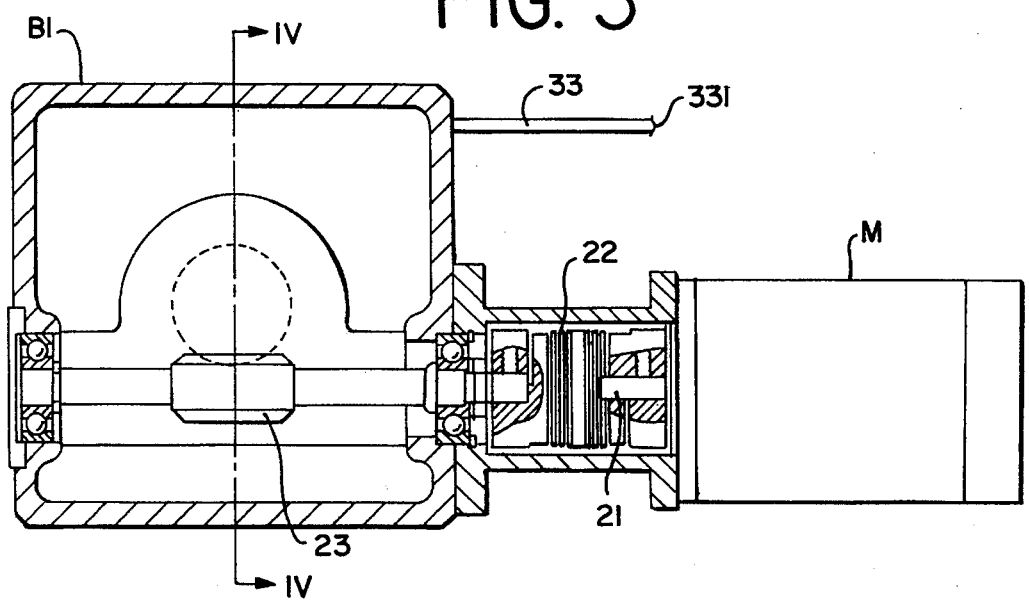
FIG. 3 is a schematic view showing the relationship between a first sheave and a driving source unit of the servo system according to the present invention.

The sheave unit (B) includes a first sheave (31) (see FIG. 4) and a first flexible measuring tape (33) (see FIG. 3). The first sheave (31) is generally in the shape of a pan and has the first measuring tape (33) wound thereon. A first rotary shaft (32) is coupled operably to the rotary driving source (M) and the first sheave (31) and is driven by the rotary driving source (M) to rotate. A clutch means, which is a torque-limited friction clutch means, is provided to permit co-rotation between the first rotary shaft (32) and the first sheave (31) during normal conditions and to permit free rotation of the first rotary shaft (32) relative to the first sheave (31) during the presence of a large resistance to rotation of the first sheave (31) so as to prevent snapping of the first measuring tape (33) in order to protect the other components of the system from damage.

The first measuring tape (33) has a first end portion secured to the first sheave (31), a second end portion (331) coupled to the adjusting means (4,5,6,7) and an intermediate portion wound on the first sheave (31) along an outer peripheral surface of the first sheave (31).

The adjusting means (4,5,6,7) is coupled to a spool (11) (see FIG. 6) of the servo valve (1) and itself has a function of controlling the spool (11) of the servo valve (1) to move by a distance equivalent to linear displacement of the first measuring tape (33) multiplied by an optionally selected factor less than 1.

The servo valve (1) is a mechanical servo valve (1) and is available in the market. The spool (11) of the servo valve (1) is a spring-biased movable spool. The servo valve (1) effects servo control function in order to transmit hydraulic energy to the hydraulic driving unit (A) when the spool (11) is moved by the adjusting means (4,5,6,7).

The hydraulic driving unit (A) is available in the market and may be a piston-type linear movement hydraulic cylinder, a rotary hydraulic cylinder or a hydraulic motor. The hydraulic driving unit (A) can convert hydraulic energy into linear or rotary displacement to drive the driven body (C).

The driven body (C) is appropriately confined to move along a fixed orbit and is coupled to the hydraulic driving unit (A) so as to be driven by the latter. The first sheave (31) is provided on the driven body (C) so that the first sheave (31) moves synchronously with the driven body (C), thereby feeding servo lag and servo error signals back to the adjusting means (4,5,6,7) and the servo valve (1).

Due to the arrangement described above, when the rotary driving source (M) is activated, the first sheave (31) is caused to wind and unwind the first measuring tape (33) during normal conditions. The adjusting means (4,5,6,7) then moves the spool (11) by a distance equivalent to linear displacement of the first measuring tape (33) multiplied by a selected factor less than 1. Then, the driving unit (A) is activated by the servo valve (1) to drive the driven body (C).

At the time the driven body (C) is moved, the servo lag and servo error signals are fed back to the driven body (C) directly in a linear displacement manner by the first measuring tape (33) which is fixed between the sheave (32) and the driven body (C). After the amplitude of the feedback signals is reduced appropriately through the adjusting means (4,5,6,7), the feedback signals are transferred to the servo valve (1) together with the main control command signal, such that a first closed-loop mechanical hydraulic servo control cycle is completed. The amplitude of the feedback signals described above are reduced according to the linkage ratio, lever ratio or gear ratio which are adjusted based on the system performance. The purpose is to control the driven body (C) to move by a servo motion of minimum vibration, minimum servo lag, little or no over shoot, little or no hysteresis, little or no resonance, best servo gain and best dynamic response.

In addition, the displacement detecting device (47) is available in the market and is fixed to a stationary member (48) (see FIG. 6). The detecting device (47) has a detecting head which is aligned with the movement direction of the spool (11) of the servo valve (1), and is adjacent to the outer distal end of the spool (11) or its follower. The detecting device (47) detects the displacement of the spool (11), that is the actual servo lag which occurred, converts the displacement of the spool (11) into electric analog or pulse signals, and then feeds the error back to the electric control unit (D).

The electric control unit (D) can calculate the value of compensation corresponding to the feedback signal, and converts the value of compensation into a compensating control signal. The compensating control Signal is output to the rotary driving source (M) to drive the system to make displacement compensation movement via an output interface (not shown), the first measuring tape (33) and the adjusting means (4,5,6,7). Further, this compensation movement can also be used to control the fraction of opening of the metering orifice or window of the servo valve (1) so as to achieve the function of controlling the pressure of output hydraulic media.

The displacement detecting unit (47) may be an inducing-type or mechanical-type limit switch and is used to detect the two limit positions of the servo valve (1) or its follower so as to detect excess movement in order to prevent the spool from over-stroke.

The rotary driving source (M) and its decelerating mechanism can receive signals from the electric control unit so as to rotate the first sheave (31) and to tighten or release the first measuring tape (33) appropriately. Thereafter, the adjusting means (4,5,6,7) moves the spool (11) by a distance equivalent to linear displacement of the first measuring tape (33) multiplied by a selected factor less than 1. The servo valve (1) then activates the hydraulic driving unit (A) so as to drive the driven body (C) to do servo compensation movement according to the compensation value.

Thus, using the arrangement described above, the error in displacement of the spool (11) is detected by the displacement detecting unit (47). Since the value of the error and the actual servo lag of the driven body (C) having a constant ratio, the error in displacement of the spool (11) can then be converted by cycling in sequence via the components of the system to correct movement of the driven body until the compensation is achieved, thus completing another electric compensating closed-loop servo control cycle.

As described above, the operation flow sequence of the dual closed-loop servo control system is as follows:

Initially, the rotary driving source (M) is activated by the electric control unit (D) so as to rotate the first sheave (31) of the sheave unit (B) in order to wind and unwind the first measuring tape (33). Then, the linear displacement of the first measuring tape (33) is transmitted through the adjusting means (4,5,6,7) to the spool (11) of the servo valve (1). The adjusting means (4,5,6,7) moves the spool (11) by a distance equivalent to linear displacement of the first measuring tape (33) multiplied by a selected factor less than 1. Movement of the spool (11) causes the hydraulic driving unit (A) to drive the driven body (C), such that a first part of servo cycle, i.e. the driving control cycle, is completed.

Once an error in the displacement of the driven body (C) occurs and is detected, this error may be fed back and compensated via two feedback channels.

The first feedback channel is classified as a mechanical-type feedback cycle. When an error in the displacement of the driven body (C) is encountered, the error is fed back to the adjusting means (4,5,6,7) via the sheave unit (B) which is mounted on the driven body, (C). The adjusting means (4,5,6,7) reduces the amplitude of the feedback signal depending upon a predetermined lever ratio and then transfers the same to the spool (11) for making corresponding compensation movement. This feedback signal is characterized by direct and continuous mechanical transmission, and the feedback signal intensity and the main control signal can be mixed and transmitted, and can be properly adjusted so that the strength of the signal depends on the system performance in order to prevent loss of control the system or resonance.

The second feedback channel is classified as an electric-type compensating cycle. When the driven body (C) encounters an error, a displacement variation of the spool (11) will appear at the same time so that the displacement detecting device (47) can be used to detect the variation in displacement of the spool (11) from its neutral position so that the actual movement error of the system is determined. The movement error is returned to the electric control unit in the form of an electrical signal. After the electric control unit has analyzed the movement error, a compensating value is obtained. Then, the rotary driving source (M), sheave unit (31), adjusting means (4,5,6,7) and servo valve (1) are activated so as to generate corresponding control function in order to drive the driven body (C) to make compensating movement due to action of the hydraulic driving unit (A). This feedback cycle is characterized in that the actual system movement error can be detected and a more flexible compensation function can be achieved so as to increase the system precision.

The cycle as described above belongs to a three-in-one closed-loop type servo loop, that is, electric, mechanical and hydraulic. Compensation can be performed instantaneously when the actual servo lag is detected so as to increase the system precision, and the opening of the servo valve (1) can be controlled so as to control the output pressure.

The dual servo compensating loop device and system arrangement of the present invention can make the conventional mechanical servo driving construction more precise, more reliable, more practical, more useful, and more flexible for application to various hydraulic servo driving systems with different functions, such as manual control, remote control, digital control, electric control, etc.

Further, the intensity of the feedback signal can be adjusted optionally so that the whole system can be adjusted properly depending upon the degradation of the various components and the variation of the conditions during operation in order to solve the unpredictable vibrating of the conventional servo system and to solve the problem of resonance which is dangerous and which can cause destruction, thereby making the servo system with flexible measuring tape ideal for remote control.

Figure 2:
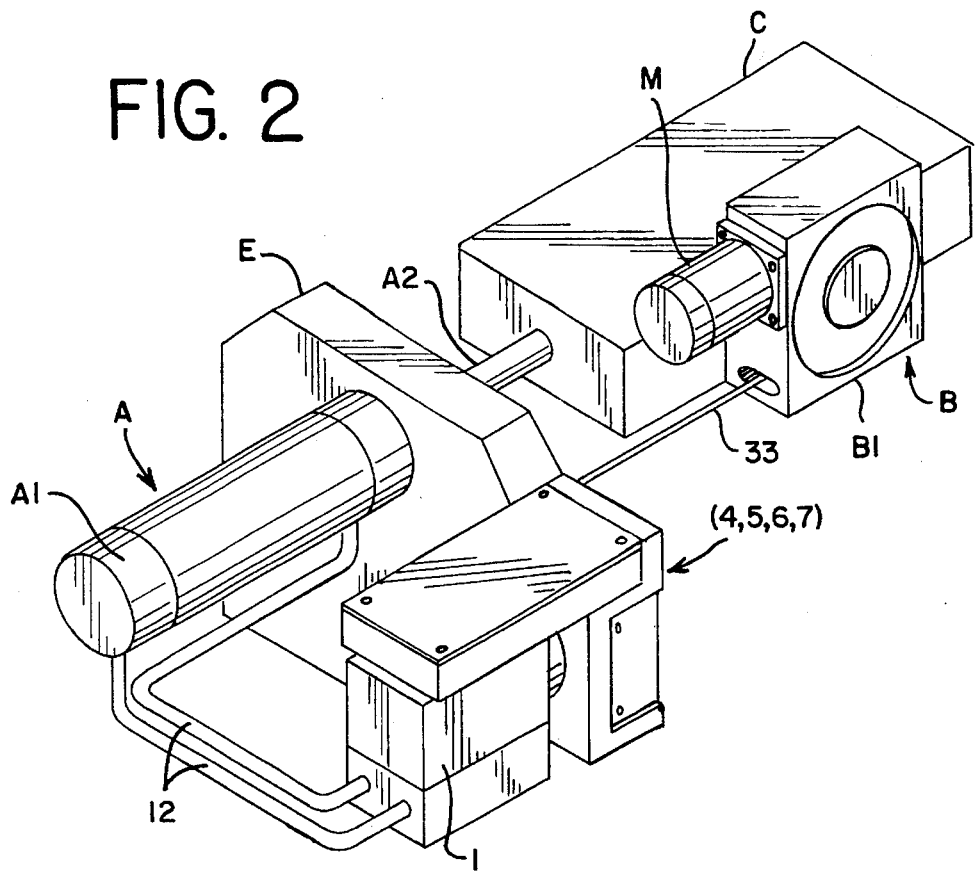
FIG. 2 is a schematic perspective view illustrating a portion of the servo system according to the present invention.

Referring to FIGS. 2, 3 and 4, the hydraulic driving unit (A) is a linear movement hydraulic cylinder having a housing (A1) secured on a stationary support frame (E) and a piston rod (A2) extending movably from the housing (A1). The piston rod (A2) has an outer end connected to the driven body (C) such that the driven body (c) moves synchronously therewith. The sheave unit (B) includes a casing (B1) in which the first sheave (31) and the first rotary shaft (32) are disposed. The casing (B1) is fixed on the driven body (C). The motor (M) is provided on the casing (B1) and is coupled operably to the first rotary shaft (32). The adjusting means (4,5,6,7) and the servo valve (1) are coupled to each other and are mounted on the support frame (E). The servo valve (1) is communicated fluidly with the hydraulic driving unit (A) via the oil passages (12).

When the motor receives a command signal to rotate, the first sheave (31) rotates so as to wind or unwind the first measuring tape (33). Then, through the adjusting means (4,5,6,7) the tape displacement is transmitted to the spool (11) of the servo valve (1) by a distance equivalent to linear displacement of the first measuring tape (33) multiplied by a selected factor less than 1. Movement of the spool (11) causes activation of the piston rod (A2) of the hydraulic driving unit (A) so as to drive the driven body (C).

Once an error in the movement of the driven body (C) occurs, an error signal is fed back to the adjusting means (4,5,6,7) directly via the first measuring tape (33) in order to generate the function of error compensation.

Referring to FIGS. 3 to 7, a first embodiment of the present invention is shown. As best shown in FIGS. 3 and 4, the motor has a driving shaft (21) which is coupled operably to a coupling member (22) and a worm rod (23). The worm rod (23) extends into the casing (B1) of the sheave assembly (B) and engages a worm gear (24) which is mounted securely on the first rotary shaft (32) that is disposed rotatably in the casing (B1). When the motor is activated, the driving shaft (21) rotates. Rotation of the driving shaft (21) results in rotation of the coupling member (22) and the worm rod (23) so as to cause the worm gear (24) and the first rotary shaft (32) to rotate.

The first sheave (31) is hollow and has an annular inner wall having threads thereon and an outer peripheral surface on which the first measuring tape (33) is wound. The first end portion of the first measuring tape (33) is fixed to the first sheave (31). The first rotary shaft (32) extends through the first sheave (31). A clutch means, which is a torque-limited friction clutch means, includes an inwardly extending flange (311) formed in the inner wall of the first sheave (31), a radial outwardly extending flange (321) formed on a periphery of the first rotary shaft (32) and normally in contact with the inwardly extending flange (311), and a biasing unit (34) which biases the radial outwardly extending flange (321) to abut against the inwardly extending flange (311) so as to generate friction between the inwardly extending flange (311) and the radial outwardly extending flange (321) when the first rotary shaft (32) rotates, thereby causing corresponding rotation of the first sheave (31) during the absence of a large resistance to rotation of the first sheave (31). The clutch means permits the first rotary shaft (32) to rotate freely relative to the first sheave (31) during the presence of a large resistance to rotation of the first sheave (31) so as to prevent snapping of the first measuring tape (33). The biasing unit (34) includes a nut (341) which has an outer peripheral surface having threads thereon and which engages threadably the first sheave (31), and a disk spring (342) provided between the nut (341) and the radial outwardly extending flange (321). The friction between the inwardly extending flange (311) and the outwardly extending flange (321) can be adjusted by rotating the nut (341).

As best shown in FIGS. 5, 6, and 7, the adjusting means (4) is a linkage mechanism and includes a housing (41) which has two opposed side walls and which is mounted securely on the support frame (E) (see FIG. 2). A second rotary shaft (42) extends between the two opposed side walls of the housing (41) and is mounted rotatably thereon. An idler wheel (46) is disposed in the housing (41) and is mounted rotatably on at least one of the side walls of the same. The idler wheel (46) has the first measuring tape (33) trained thereon. A first pivot arm (43) is disposed in the housing (41) and has a first arm portion (431) which has a first end portion fixed to the second rotary shaft (42) and a second end portion. The first pivot arm (43) further has a second arm portion (432) which is slidable relative to the first arm portion and which has a first end portion connected adjustably to the second end portion of the first arm portion (431) by means of fasteners (45) and a second end portion to which the first measuring tape (33) is fixed. The fasteners (45) extend through a longitudinally extending groove (433)

on the first end portion of the second arm portion (432) and into the second end portion of the first arm portion (431) such that relative movement therebetween is prohibited. When the fasteners (45) are loosened, the second arm portion (432) is slidable relative to the first arm portion (431) so as to vary the length of the first pivot arm (43). The second end portion (331) of the first measuring tape (33) is fixed to the second arm portion (432) by means of a positioning member (434). The adjusting means (4) further includes a biasing unit (435) which is disposed in the housing (41). In the present embodiment, the biasing unit (435) is a coil spring having one end fixed to at least one of the side walls of the housing (41) and the other end fixed to the second end portion of the second arm portion (432) so as to provide a biasing force for the first pivot arm (43) against pulling action of the first measuring tape (33).

A second pivot arm (44) is disposed in the housing (41) and has a first end portion fixed to the second rotary shaft (42) and a second end portion which has a contact surface (441) normally in contact with the spool (11) since the spool (11) is constantly biased to extend outwardly from the housing (10) of the servo valve (1) by a spring member (not shown).

When the first sheave (31) rotates to wind the first measuring tape (33), the first pivot arm (43) is pulled to pivot and rotate the second rotary shaft (42). Rotation of the second rotary shaft (42) results in pivoting of the second pivot arm (44) so as to move the spool (1) by a distance equivalent to linear displacement of the first measuring tape (33) multiplied by a selected factor less than 1 in order to activate the hydraulic driving unit (A) to move the driven body (C).

The selected factor can be adjusted by varying the length of the first pivot arm (43). Therefore, proper adjustment of the length of the first pivot arm (43) optionally depending upon the system conditions, can prevent the system from vibrating, over shooting, over control, poor reliability, etc.

A mounting frame for supporting the idler wheel (46) includes a stationary frame member (460) disposed in the housing (41) and a movable frame member (461) connected movably to the stationary frame member (460). The movable frame member (461) is formed with a longitudinally extending groove (462) and has the idler wheel (46) mounted thereon. Fasteners (463) extend through the groove (462) and into the stationary frame member (460) to secure the movable frame member (461) on the stationary frame member (460). Loosening of the fasteners (463) permits the movable frame member (461) to move relative to the stationary frame member (460) so as to vary the position of the idler wheel (46) in order to ensure that the first measuring tape (33) is parallel to the spool (11) and to ensure that the connecting line (a—a), which joins the fixed point of the second end portion (331) of the first measuring tape (33) and the center of the second rotary shaft (42), is generally perpendicular to the tangent line (b—b) which extends from the periphery of the idler wheel (46) to the fixed point of the second end portion (331) of the first measuring tape (33).

The displacement detecting unit (47) is available in the market and is fixed to a locating plate (48) which is provided on one end of the housing (41) adjacent to the second rotary shaft (42). The detecting unit (47) has a detecting head facing directly a back surface (442) of the second pivot arm (44). The back surface (442) is opposite to the contact surface (441) so that the detecting unit (47) can detect the displacement variation of the spool (11) relative to its reference position, converts the detected displacement variation of the spool (11) into an analog signal, and then transmits the same to the electric control unit (D). The displacement detecting unit (47) can be replaced by a rotary decoder (not shown) which is mounted directly on the second rotary shaft (42) to detect the angular displacement variation of the second pivot arm (44) to obtain the servo lag of the spool (11). The detected angular displacement variation is transmitted to the electric control unit (D) in the form of a pulse signal and is analyzed to obtain the compensating value.

Additionally, two spaced limit switches (491,492), such as microswitches, may be provided in the housing (41) adjacent to the second end portion of the second arm portion (432). The second end portion of the second arm portion (432) has an endmost point (436) which is movable between but does not activate either one of the limit switches (491, 492) during normal conditions. However, the endmost point (436) moves to activate at least one of the limit switches (491,492) during an abnormal condition so that occurrence of the abnormal condition can be detected.

Figure 8:
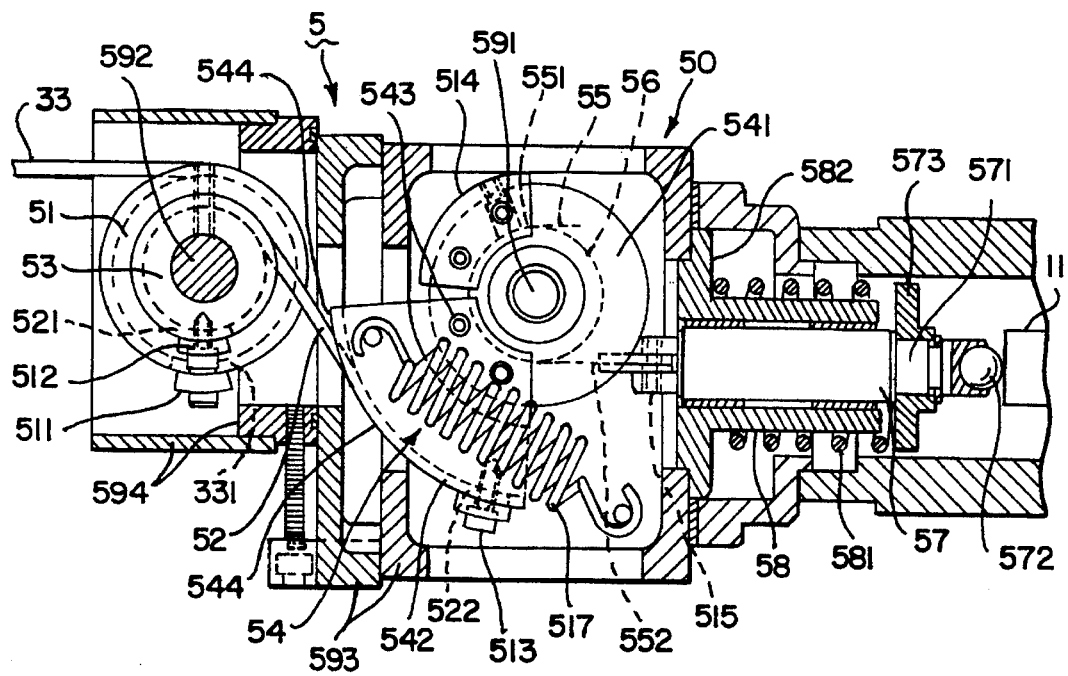
FIG. 8 is a schematic view showing an adjusting means of a servo system according to a second embodiment of the present invention.
Figure 9:
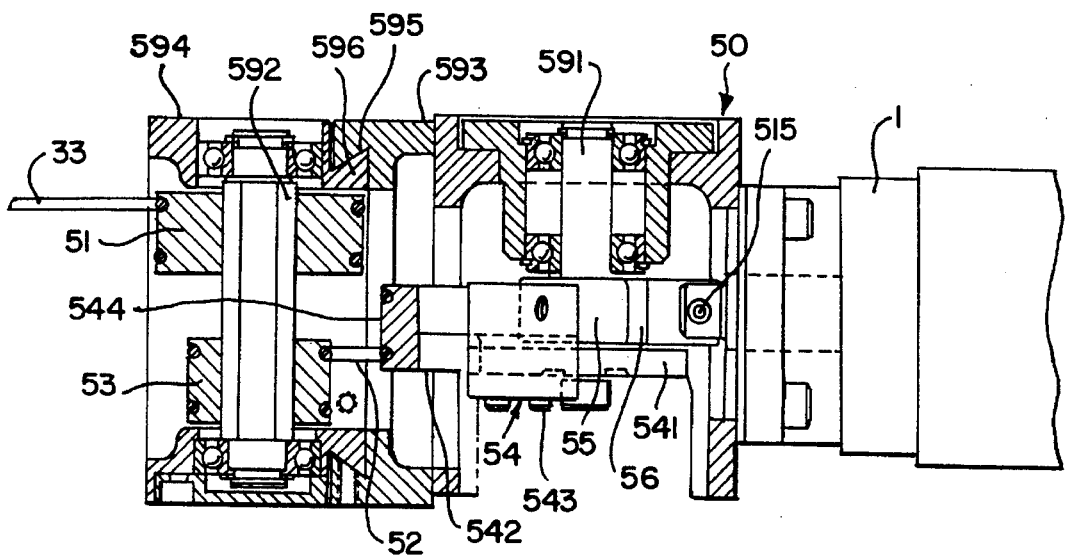
FIG. 9 is another schematic view illustrating the adjusting means shown in FIG. 8.

Referring to FIGS. 8 and 9, an adjusting means (5) of the servo system of a second embodiment of the present invention is shown. Unlike the first embodiment, the adjusting means (5) includes a hollow housing (50), a second rotary shaft (591), a coupling means, a second flexible measuring tape (55), a driven shaft (57) and a biasing unit (517). The housing (50) includes a first housing part (593) and a second housing part (594) which is connected to the first housing part by means of a dovetail dado (596) and a dovetail groove (595). In the present embodiment, the dovetail dado (56) is provided on the second housing part (594), while the dovetail groove (595) is provided on the first housing part (593). Each of the first and second housing parts (593,594) has two opposed side walls. A bushing (58) is connected to the first housing part (593). The second rotary shaft (591) extends between the two opposed side walls of the first housing part (593) and is mounted rotatably thereon. The second rotary shaft (591) is formed with a drum portion (56).

The coupling means includes a second sheave (54), the second sheave (54) has a tubular portion (541) mounted securely on the second rotary shaft (591) and a fan-shaped portion (542) which is secured to the tubular portion (541) by means of locking bolt (543) and which extends radially outward from the tubular portion (541). The fan-shaped portion (542) has a curved periphery (544). A third rotary shaft (592) extends between the two opposed side walls of the second housing part (594) and is mounted rotatably thereon. A first drum (51) is mounted securely on the third rotary shaft (592). The second end portion (331) of the first measuring tape (33) is trained on and is fixed to the first drum (51) by a positioning member (511). A second drum (53) is mounted securely on the third rotary shaft (592). A third measuring tape (52) has a first end portion (521) which is trained on and fixed to the second drum (53) by a positioning member (512) and a second end portion (522) which is trained on and fixed to the curved periphery (544) of the fan-shaped portion (542) of the second sheave (54) by a positioning member (513). It should be noted that the tubular portion (541) may be formed integrally with the second rotary shaft (591).

The second flexible measuring tape (55) has a first end portion (551) which is trained on and which is fixed to the drum portion (56) of the second rotary shaft (591) by a positioning member (514) and a second end portion (552).

The driven shaft (57) is supported by the bushing (58) and has a first end portion (571) and a second end portion extending into the housing (50). The first end portion (571) is formed with a radial outwardly extending flange (573) and has an endmost point provided with a ball member (572) thereat. The ball member (572) is normally in contact with the spool (11) of the servo valve (1). The second end portion (552) of the second measuring tape (55) is fixed to the second end portion of the driven shaft (57) by means of a positioning member (515). A coiled spring (581) is sleeved on the bushing (58) between the flange (582) of the bushing (58) and the radial outwardly extending flange (573) for normally biasing the driven shaft (57) toward the spool (11).

A biasing unit (517) is disposed in the housing (50). In the present invention, the biasing unit (517) is a spring member having one end secured to the housing (50) and the other end fixed to the fan-shaped portion (542).

Thus, pulling of the first measuring tape (33) causes the first and second drums (51,53) to rotate so as to pull the third measuring tape (52) in order to rotate the second sheave (54) and the second rotary shaft (591), there, by resulting in longitudinal movement of the driven shaft (57) and in movement of the spool (11). The biasing unit (517) provides a biasing force for the second sheave (54) against pulling action of the third measuring tape (52). In the present invention, the distance moved by the spool (11) is also equivalent to the linear displacement of the first measuring tape (33) multiplied by a selected factor less than 1. The selected factor is related to the deceleration ratio between the first drum (51), the second drum (53), the drum portion (56) and the second sheave (54). The selected factor is adjusted when the fan-shaped portion (542) is replaced by one which has a radius different from that of the fan-shaped portion (542).

The use of the bushing (58) mainly decreases the effect of high temperature transmission of the servo valve (1). The central position of the first measuring tape (33) can be varied optionally by varying the relative position between the dovetail dado (596) and the dovetail groove (595). This facilitates the adjustment of the relative position of the components of the system while setting the lengths of the measuring tapes. The adjusting means (5) employed in the second embodiment of the present invention has the following advantages:

1. Since measuring tapes are used as the signal transmitting media, no wearable components are employed.

2. The selected factor depends on the decreasing ratio between the first and second drums (51,53) and the decreasing ratio between the second sheave (54) and the drum portion (56) so that the adjustment means (5) is easy to adjust and more compact. It should be noted that the use of the first and second drums (51,53) facilitates the alignment of the measuring tape with the spool (11) and the use of the second sheave (54) and the drum portion (56) facilitates the adjustment of the selected factor.

3. The central position of the first measuring tape (33) can be adjusted optionally so as to facilitate the setting and mounting of the components of the system.

4. The selected factor can be adjusted easily and quickly by replacing a new moldurized second sheave (54).

It should be noted that the second end portion (331) of the first measuring tape (33) can be fixed directly to the second Sheave (54) to achieve the same advantage.

Figure 10:
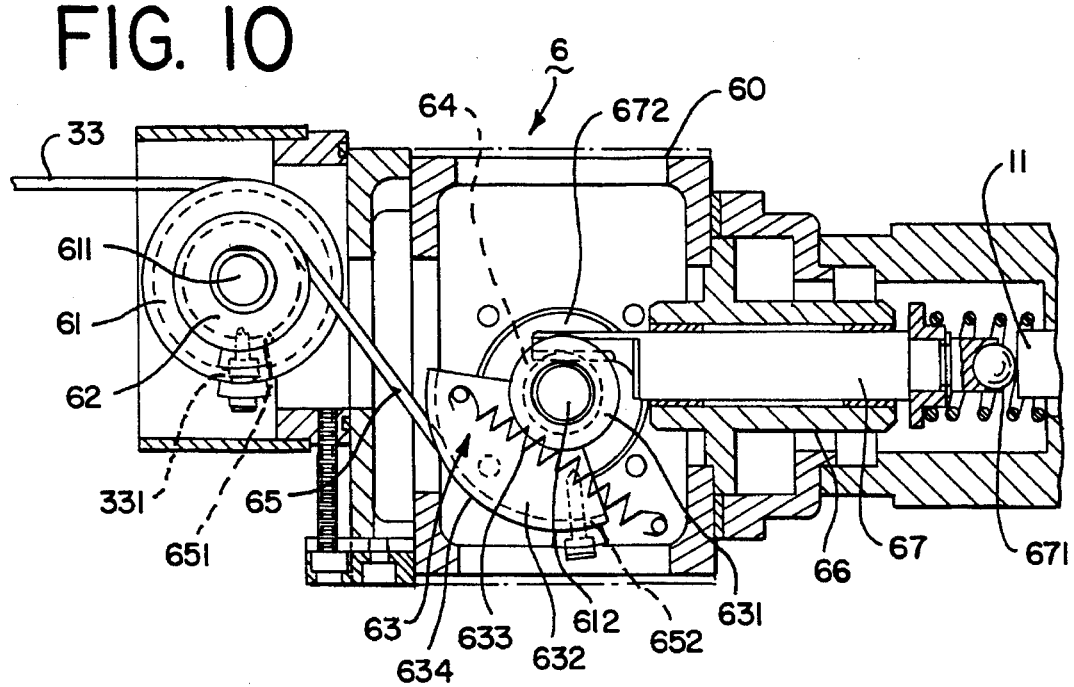
FIG. 10 is a schematic view showing an adjusting means of a servo system according to a third embodiment of the present invention.
Figure 11:
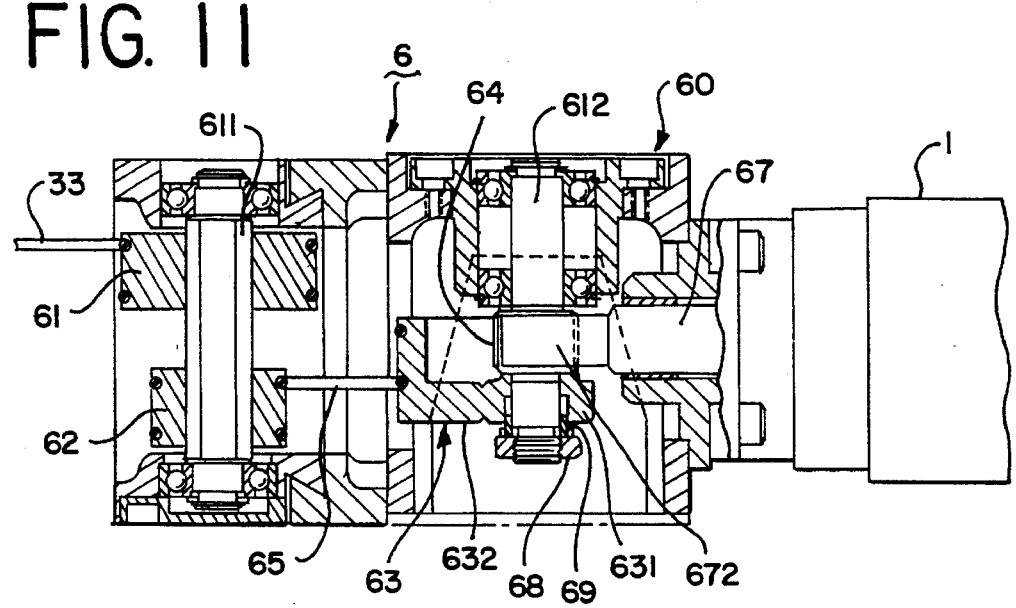
FIG. 11 is another schematic view illustrating the adjusting means shown in FIG. 10.

Referring to FIGS. 10 and 11, an adjusting means (6) of the servo system of a third embodiment of the present invention is shown. The adjusting means (6) includes a hollow housing (60) which is similar to the that of the adjusting means (5) of the servo system of the second embodiment of the present invention. A second rotary shaft (612) extends between the two opposed side walls and is mounted rotatably thereon. A coupling means includes a second sheave (63) mounted securely on the second rotary shaft (612), a third rotary shaft (611) which extends between the two opposed side walls and which is mounted rotatably thereon, a first drum (61) mounted securely on the third rotary shaft (611), a second drum (62) mounted securely on the third rotary shaft (611), and a second measuring tape (65) having a first end portion (651) trained on and fixed to the second drum (62) and a second end portion (652) trained on and fixed to the second sheave (63). The second end portion (331) of the first measuring tape (33) is trained on and is fixed to the first drum (61). A pinion (64) is mounted securely on the second rotary shaft (612). A driven shaft (67) is supported by a bushing (66) which is connected to the housing (60) and has a first end portion normally in contact with the spool (11) via a ball (671) mounted thereon and a second end portion which extends into the housing (60) and which is formed with a rack (672) thereat. The rack (672) meshes with the pinion (64) such that rotation of the pinion (64) causes longitudinal movement of the driven shaft (67).

Therefore, pulling of the first measuring tape (33) causes the second and third drums (61,62) to rotate so as to pull the second measuring tape (65) in order to rotate the second sheave (63) and the pinion (64), thereby resulting in movement of the spool (11).

It should be noted that the adjusting means (6) further includes a biasing unit (633) which has a function similar to that employed in the adjusting means (5) of the servo system of the second embodiment. Thus, a detailed description of the biasing unit (633) is abbreviated herein.

It should be appreciated that the second sheave (63) includes a tubular portion (631) mounted securely on the second rotary shaft (612) by means of a locking nut (68) and an expansive conical ring (69) disposed between the nut (68) and the tubular portion (631) and a fan-shaped portion (632) that extends radially outward from the tubular portion (631). The fan-shaped portion (632) has a curved periphery (634) on which the second measuring tape (65) is trained and fixed. Thus, the second sheave (63) can be replaced conveniently by loosening the nut (68) so as to vary the ratio of deceleration.

Figure 12:
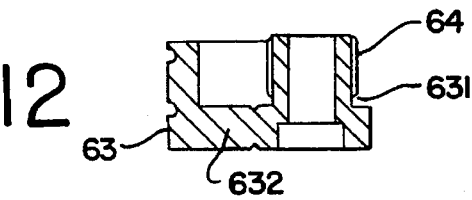
FIG. 12 is a sectional view showing a second sheave of an adjusting means of a servo system according to a fourth embodiment of the present invention.

Referring to FIG. 12, a second sheave (63) and a mounting means of an adjusting means of the servo system of a fourth embodiment is shown. Unlike the third embodiment, the pinion (64) is formed integrally with the tubular portion (631) of the second sheave (63).

Figure 13:
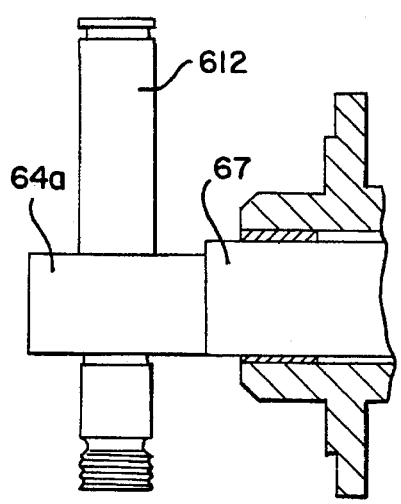
FIG. 13 is a schematic view showing an adjusting means of a servo system according to a fifth embodiment of the present invention.
Figure 14:
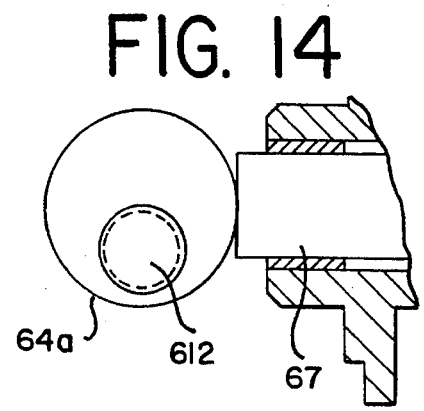
FIG. 14 is another schematic view illustrating the adjusting means shown in FIG. 13.

Referring to FIGS. 13 and 14, an adjusting means of the servo system of a fifth embodiment of the present invention is partly shown. The pinion (64) of the adjusting means employed in the third embodiment is replaced by a cam member (64a) mounted securely on the second rotary shaft (612). In the present embodiment, the cam member (64a) is an eccentric roller. The second end portion of the driven shaft (67) is normally in contact with the periphery of the cam member (64a) such that rotation of the cam member (64a) results in longitudinal movement of the driven shaft (67).

Figure 15:
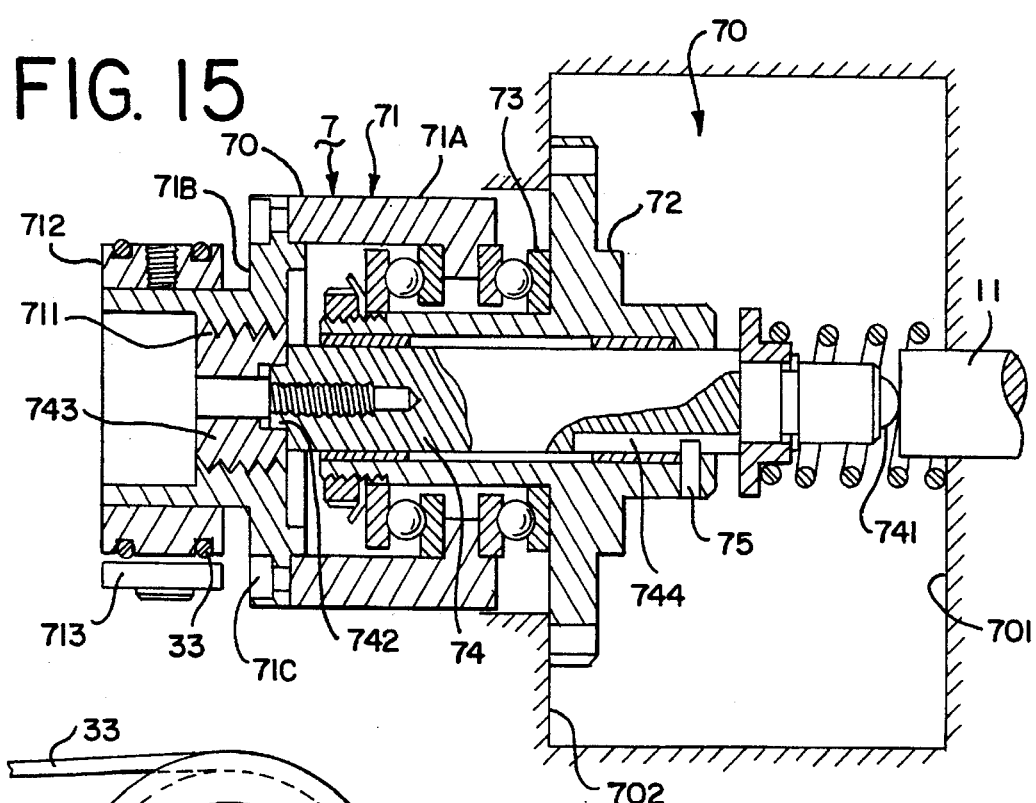
FIG. 15 is a schematic view showing an adjusting means of a servo system according to a sixth embodiment of the present invention.
Figure 16:
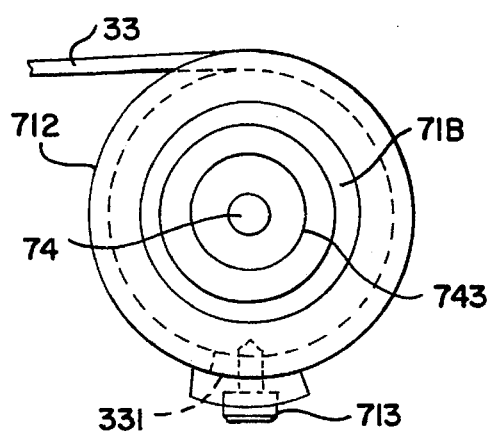
FIG. 16 is another schematic view illustrating the adjusting means shown in FIG. 15.

Referring now to FIGS. 15 and 16, an adjusting means (7) of the servo system of a sixth embodiment of the present invention is shown. The adjusting means (7) includes a hollow housing (70) having two opposed side walls (701, 702). A hollow driving shaft (71) extends through the two opposed side walls (701,702) of the housing (70) and is mounted rotatably thereon. A second sheave (712) is mounted securely on the driving shaft (71) and has the second end portion (331) of the first measuring tape (33) trained thereon and secured thereto by means of a positioning member (713) such that linear displacement of the first measuring tape (33) causes the driving shaft (71) to rotate. A bushing (72) mounted on the wall (702) has an inner end portion extending into the driving shaft (71). A thrust bearing (73) is provided between an outer periphery of the inner end portion of the bush (72) and an inner wall of the driving shaft (71) such that the driving shaft (71) is movable only in an angular direction. The inner wall of the driving shaft (71) has a threaded portion (711). A driven shaft (74) is supported by the bushing (72) and has a first end portion (741) normally in contact with the spool (11) and a second end portion (742) which has a threaded member (743) mounted thereon and which extends into the driving shaft (71). The bushing (72) has an outer end portion which is formed with a radial through-hole. The first end portion of the driven shaft (74) has an outer peripheral surface which is formed with a longitudinally extending groove (744). A pin (75) extends through the through-hole of the bushing (72) and into the groove (744) of the driven shaft (74) such that the driven shaft (74) is movable only in a longitudinal direction. The threaded member (743) engages threadably the driving shaft (71) so that rotation of the driving shaft (71) results in longitudinal movement of the driven shaft (74).

Therefore, pulling of the first measuring tape (33) results in longitudinal movement of the driven shaft (74) in order to move the spool (11).

It should be noted that the driving shaft (71) includes a ring member (71A) and a threaded member (71B) which is connected to the ring member (71A) by means of locking bolts (71C) such that the selected factor can be adjusted by replacing the threaded member (71B) and the threaded member (743) or by replacing the second sheave (712).

I claim:

1. A servo system, comprising:
   a driven body,
   a hydraulic driving unit for moving said driven body,
   a mechanical hydraulic servo valve including a spring-biased movable spool, said servo valve being capable of activating said driving unit to move said driven body when said spool is moved,
   a first sheave mounted on said driven body, said first sheave having an outer peripheral surface, a first flexible measuring tape having a first end portion secured to said first sheave, a second end portion, and an intermediate portion wound on said first sheave along said outer peripheral surface of said first sheave, and
   a rotary driving source coupled operably to said first sheave and operable to rotate said first sheave in order to wing and unwind said first measuring tape, and characterized by
   adjusting means, coupled to said second end portion of said first measuring tape and said spool, for moving said spool by a distance equivalent to linear displacement of said first measuring tape multiplied by a selected factor less than 1 so as to improve performance of said system.

2. A servo system as claimed in claim 1, further comprising a first rotary shaft which is coupled operably to said rotary driving source and said first sheave and which is driven by said rotary driving source to rotate so as to cause corresponding rotation of said first sheave, and a clutch means for permitting said first rotary shaft to rotate freely relative to said first sheave during presence of large resistance to rotation of said first sheave so as the prevent snapping of said first measuring tape.

3. A servo system as claimed in claim 2, wherein said first sheave is hollow and has an annular inner wall, said first rotary shaft extending through said first sheave, said clutch means including an inwardly extending flange formed in said inner wall of said first sheave, a radial outwardly extending flange formed on a periphery of said first rotary shaft and normally in contact with said inwardly extending flange, and a biasing unit which biases said radial outwardly extending flange to abut against said inwardly extending flange so as to generate friction between said inwardly extending flange and said radial outwardly extending flange when said first rotary shaft rotates, thereby causing corresponding rotation of said first sheave during absence of the large resistance to rotation of said first sheave.

4. A servo system as claimed in claim 1, further comprising a detecting unit for detecting the distance moved by said spool and for generating a feedback signal corresponding to an error in the movement of said spool, and an electric control unit connected to said detecting unit and receiving said feedback signal from said detecting unit, said control unit generating an enable signal corresponding to said feedback signal to activate said rotary driving source so as to compensate linear displacement of said first measuring tape in order to move said driven body and correct the error.

5. A servo system as claimed in claim 1, wherein said adjusting means includes:
   a hollow housing having two opposed side walls;
   a second rotary shaft extending between said two opposed side walls and being mounted rotatably thereon;
   an idler wheel disposed in said housing and mounted rotatably on at least one of said side walls, said idler wheel having said first measuring tape trained thereon;
   a first pivot arm being disposed in said housing and having a first arm portion fixed to said second rotary shaft and a second arm portion to which said second end portion of said first measuring tape is fixed; and
   a second pivot arm being disposed in said housing and having a first end portion fixed to said second rotary shaft and a second end portion normally in contact with said spool;
   whereby, pulling of said first measuring tape causes said first pivot arm to pivot so as to result in pivoting of said second pivot arm in order to move said spool.

6. A servo system as claimed in claim 5, wherein said first arm portion has a first end portion fixed to said second rotary shaft and a second end portion, said second arm portion having a first end portion connected adjustably to said second end portion of said first arm portion by means of fasteners and a second end portion to which said tape is fixed.

7. A servo system as claimed in claim 5, wherein said adjusting means further includes a biasing unit which is disposed in said housing and which provides a biasing force for said first pivot arm against pulling action of said first measuring tape.

8. A servo system as claimed in claim 1, wherein said adjusting means includes
   a hollow housing having two opposed side walls,
   a second rotary shaft extending between said two opposed side walls and being mounted rotatably thereon, said second rotary shaft being formed with a drum portion,
   a coupling means for coupling said second end portion of said first measuring tape and said second rotary shaft and for converting linear displacement of said first measuring tape into rotation of said second rotary shaft,
   a second flexible measuring tape having a first end portion which is trained on and which is fixed to said drum portion of said second rotary shaft and a second end portion, and a driven shaft having a first end portion coupled to said spool and a second end portion to which said second end portion of said second measuring tape is fixed so that rotation of said second rotary shaft results in axial movement of said driven shaft, whereby, pulling of said first measuring tape causes said second rotary shaft to rotate in order to move said spool.

9. A servo system as claimed in claim 8, wherein said coupling means of said adjusting means includes a second sheave mounted securely on said second rotary shaft, a third rotary shaft which extends between said two opposed side walls of said housing and which is mounted rotatably thereon, a first drum mounted securely on said third rotary shaft, said second end of said first measuring tape being trained on and being fixed to said first drum, a second drum mounted securely on said third rotary shaft, and a third measuring tape having a first end portion which is trained on and fixed to said second drum and a second end portion which is trained on and fixed to said second sheave, whereby, pulling of said first measuring tape causes said first and second drums to rotate so as to pull said third measuring tape in order to rotate said second sheave and said second rotary shaft, thereby resulting in axial movement of said driven shaft and in movement of said spool.

10. A servo system as claimed in claim 9, wherein said second sheave has a tubular portion mounted securely on said second rotary shaft and a fan-shaped portion which is secured to said tubular portion by means of locking bolt and which extends radially outward from said tubular portion, said fan-shaped portion has a curved periphery on which said second end portion of said third measuring tape is trained and fixed.

11. A servo system as claimed in claim 9, wherein said adjusting means further includes a biasing unit which is disposed in said housing and which provides a biasing force for said second sheave against pulling action of said third measuring tape.

12. A servo system as claimed in claim 1, wherein said adjusting means includes a hollow housing having two opposed side walls, a second rotary shaft which extends between said two opposed side walls and which is mounted rotatably thereon, a coupling means for coupling said second end portion of said first measuring tape and said second rotary shaft and for converting linear displacement of said first measuring tape into rotation of said second rotary shaft, a pinion mounted securely on said second rotary shaft, and a driven shaft having a first end portion coupled to said spool and a second end portion provided with a rack which meshes with said pinion such that rotation of said pinion causes longitudinal movement of said driven shaft, whereby, pulling of said first measuring tape causes rotation of said second rotary shaft and said pinion so as to result in movement of said spool.

13. A servo system as claimed in claim 12, wherein said coupling means of said adjusting means includes a second sheave mounted securely on said second rotary shaft, a third rotary shaft which extends between said two opposed side walls and which is mounted rotatably thereon, a first drum mounted securely on said third rotary shaft, said second end portion of said first measuring tape training on and being fixed to said first drum, a second drum mounted securely on said third rotary shaft, and a second measuring tape having a first end portion trained on and fixed to said second drum and a second end portion trained on and fixed to a periphery of said first drum, whereby, pulling of said first measuring tape causes said first and second drums to rotate so as to pull said second measuring tape in order to rotate said second sheave and said pinion, thereby resulting in movement of said spool.

14. A servo system as claimed in claim 13, wherein said adjusting means further includes a biasing unit which is disposed in said housing and which provides a biasing force for said second sheave against pulling action of said second measuring tape.

15. A servo system as claimed in claim 1, wherein said adjusting means includes a hollow housing having two opposed side walls, a second rotary shaft which extends between said two opposed side walls and which is mounted rotatably thereon, a coupling means for coupling said second end portion of said first measuring tape and said second rotary shaft and for converting linear displacement of said first measuring tape into rotation of said second rotary shaft, a cam wheel mounted securely on said second rotary shaft, and a driven shaft having a first end portion coupled to said spool and a second end portion contacting a periphery of said cam wheel in such a manner that rotation of said cam wheel causes longitudinal movement of said driven shaft, whereby, pulling of said first measuring tape causes rotation of said second rotary shaft and said cam wheel so as to result in longitudinal movement of said driven shaft in order to move said spool.

16. A servo system as claimed in claim 1, wherein said adjusting means includes a hollow housing having two opposed side walls, a hollow driving shaft extending through said two opposed side wails and being mounted rotatably thereon, said driving shaft being movable only in an angular direction and having an inner wall formed with threads thereon, said second end portion of said first measuring tape being trained on said driving shaft such that linear displacement of said first measuring tape causes said driving shaft to rotate, and a driven shaft being disposed in said driving shaft and having a first end portion in contact with said spool and a second end portion engaging said driving shaft, said driven shaft being movable only in a longitudinal direction such that rotation of said driving shaft results in longitudinal movement of said driven shaft, whereby, pulling of said first measuring tape results in longitudinal movement of said driven shaft in order to move said spool.

* * * * *

UNITED STATES PATENT AND TRADEMARK OFFICE
CERTIFICATE OF CORRECTION

PATENT NO. : 5,566,463
DATED : October 22, 1996
INVENTOR(S) : Chang

It is certified that error appears in the above-indentified patent and that said Letters Patent is hereby corrected as shown below:

In Claim 1, line 9, after "surface," start a new paragraph.

In Claim 1, line 16, delete "wing" and substitute therefor --wind--.

In Claim 2, line 8, delete "the" and substitute therefor --to--.

Signed and Sealed this

Seventh Day of April, 1998

Attest:

BRUCE LEHMAN

Attesting Officer

Commissioner of Patents and Trademarks